(12) United States Patent
Douglas et al.

(10) Patent No.: US 6,223,287 B1
(45) Date of Patent: Apr. 24, 2001

(54) METHOD FOR ESTABLISHING A SECURED COMMUNICATION CHANNEL OVER THE INTERNET

(75) Inventors: Daniel G. Douglas; Stewart J. Edelman, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/122,220

(22) Filed: Jul. 24, 1998

(51) Int. Cl.[7] ........................................... G06F 01/24
(52) U.S. Cl. .................. 713/178; 713/150; 713/168; 713/200; 380/28; 380/255
(58) Field of Search ..................... 380/255, 28; 713/150, 713/159, 161, 168, 172, 200, 201, 178

(56) References Cited

U.S. PATENT DOCUMENTS

| | | |
|---|---|---|
| 5,557,518 | 9/1996 | Rosen . |
| 5,559,884 | 9/1996 | Davidson et al. . |
| 5,651,068 | 7/1997 | Klemba et al. . |
| 5,657,390 | 8/1997 | Elgamal et al. . |
| 5,692,047 | 11/1997 | McManis . |
| 5,694,546 * | 12/1997 | Reisman ................................. 705/26 |
| 5,708,709 | 1/1998 | Rose . |
| 5,825,881 * | 10/1998 | Colvin Sr. ............................ 380/24 |
| 5,825,890 * | 10/1998 | Elgamal et al. ....................... 380/49 |
| 6,052,785 * | 4/2000 | Lin et al. .............................. 713/201 |

FOREIGN PATENT DOCUMENTS

| | | |
|---|---|---|
| 2312767 | 5/1997 | (GB) . |
| WO97/34426 | 9/1997 | (WO) . |
| WO97/37303 | 10/1997 | (WO) . |

* cited by examiner

*Primary Examiner*—Thomas R. Peeso
(74) *Attorney, Agent, or Firm*—Robert O. Guillot; Oppenheimer Wolff & Donnelly LLP

(57) ABSTRACT

A method for establishing a secured communication channel between a client and a server is disclosed where a program and a set of encryption information for establishing the secured communication channel are delivered from the server to the client. The set of encryption information is compact and can be used to quickly and efficiently encipher and decipher data. In particular, the client requests a program from the server via a first secured communication channel that can be established by a web browser under the HTTPS (Hypertext Transfer Protocol with SSL) protocol. The server in response dynamically generates a set of encryption information and a token identifying this particular set of encryption information. This information is then sent with the requested program. While the program can be written in any language, the language of choice is a platform-independent language such as Java. When the program executes on the client and performs its programmed tasks, one of the tasks is to establish a separate, secured communication channel with the server using the encryption information from the server.

22 Claims, 6 Drawing Sheets

METHOD FOR ESTABLISHING A SECURED COMMUNICATION CHANNEL OVER THE INTERNET

FIELD OF THE INVENTION

The present invention generally relates to methods for establishing communication channels over the internet, and, in particular, for establishing secured communication channels over the internet.

BACKGROUND OF THE INVENTION

Web browser technology has propelled the internet to what has now become a pervasive and nearly universal information superhighway whereby a wealth of information can be readily retrieved and delivered to any requesting end user. As the level of activities on the internet increases, more and more powerful tools are being demanded. In providing these tools, a platform independent programming language such as the Java language allows a program written in Java to be executed on any platform. In this manner, virtually any tool (i.e. program) can be delivered over the internet to a client site to perform a desired function at the client. Along with the increase in the level of activities on the internet, the need to exchange sensitive information over secured channels becomes important as well. For this reason, Netscape has developed the Secure Socket Layer (SSL) protocol. The primary goal of the SSL protocol is to provide privacy and reliability between two communicating applications. The protocol is comprised of two layers. At the lowest level is the SSL Record protocol, which is layered on top of some reliable transport protocol, such as for example the Transport Control Protocol (TCP), and is used for encapsulation of various higher level protocols. One such encapsulated protocol is the SSL Handshake protocol which allows the server and client to authenticate each other and negotiate an encryption algorithm and cryptographic keys before any data is communicated.

While the SSL protocol is designed for use in many applications, its main application has been with web browsers. By issuing an "https://" (Hypertext Transfer Protocol with SSL) addressing command to the web browser rather than an "http://" (Hypertext Transfer Protocol) command, a transaction through a secured communication channel is requested and the web browser responds accordingly by establishing a secured communication channel to carry out secured transactions between a client and a server.

However, in the case where an application is delivered from a server to a client, and the application wishes to open a separate secured communication channel from the client to any another machine, attention must be paid to the constraints in such a scenario, i.e., the application must be delivered to the client in the least amount of time to minimize overhead execution time and the application must have fast execution speed. In order to have an application delivered to a destination client in the least amount of time, the application has to be kept to a minimal size, which means that the algorithm for such an application must be conducive to be programmed using a minimal amount of code. Additionally, for an application to have fast execution speed, the algorithm has to be both small and efficient.

Prior art technologies using either the SSL protocol or other encryption tend to be bulky, requiring a significant amount of download time for delivery of the application, and tend to have slow execution time. Therefore, there is a need for an improved and more efficient method for establishing a secured communication channel between a client and a server.

SUMMARY OF THE INVENTION

It is therefore an object of the present invention to provide an improved method for establishing a secured communication channel between a client and a server.

It is another object of the present invention to provide a method for establishing a secured communication channel between a client and a server using an algorithm programmable using a minimal amount of code and have fast execution speed.

It is yet another object of the present invention to provide a method for establishing a secured communication channel between a client and a server wherein the encryption information for establishing the secured channel is compact and can be delivered and executed using minimal system resources.

Briefly, a presently preferred embodiment of the present invention provides a method for establishing a secured communication channel between a client and a server wherein a program and a set of encryption information for establishing the secured communication channel are delivered from the server to the client. The set of encryption information is compact and can be used to quickly and efficiently encipher and decipher data. More specifically, the client requests a program from the server via a first secured communication channel that can be established by a web browser under the HTTPS (Hypertext Transfer Protocol with SSL) protocol. The server in response dynamically generates a set of encryption information and a token identifying this particular set of encryption information. This information is then sent with the requested program to the client. While the program can be written in any language, the language of choice is a platform-independent language such as Java. When the program executes on the client and performs its programmed tasks, one of the tasks is to establish a separate, secured communication channel with the server using the encryption information from the server. The encryption method used in the preferred embodiment is a software-efficient, pseudo-random number generating algorithm. In establishing the communication channel, the token, the server time stamp, and the client time stamps are verified to establish a secured channel.

An advantage of the present invention is that it provides an improved method for establishing a secured communication channel between a client and a server.

Another advantage of the present invention is that it provides a method for establishing a secured communication channel between a client and a server using an algorithm programmable using a minimal amount of code and have fast execution speed.

Yet another advantage of the present invention is that it provides a method for establishing a secured communication channel between a client and a server wherein the encryption information for establishing the secured channel is compact and can be delivered and executed using minimal system resources.

These and other features and advantages of the present invention will become well understood upon examining the figures and reading the following detailed description of the invention.

IN THE DRAWINGS

DETAILED DESCRIPTION OF THE PREFERRED EMBODIMENTS

The present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage devices such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine readable storage devices containing the code according to the invention with appropriate standard computer hardware to execute the code contained therein. An apparatus for practicing the invention could be one or more computers and storage systems containing or having network access to computer program(s) coded in accordance with the invention.

Figure 1:
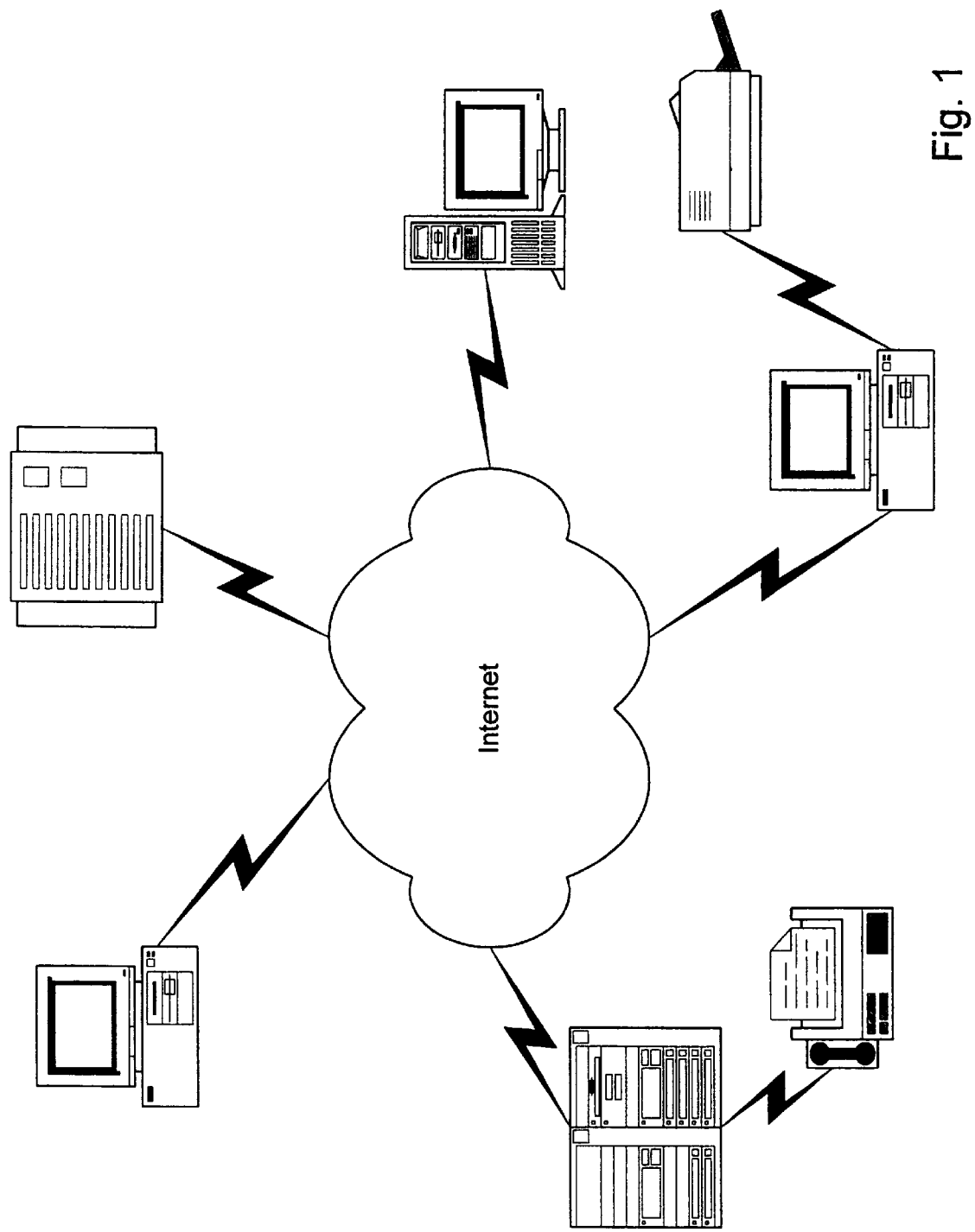
FIG. 1 illustrates a typical distributed network including a number of servers providing access to various services or devices.
Figure 2:
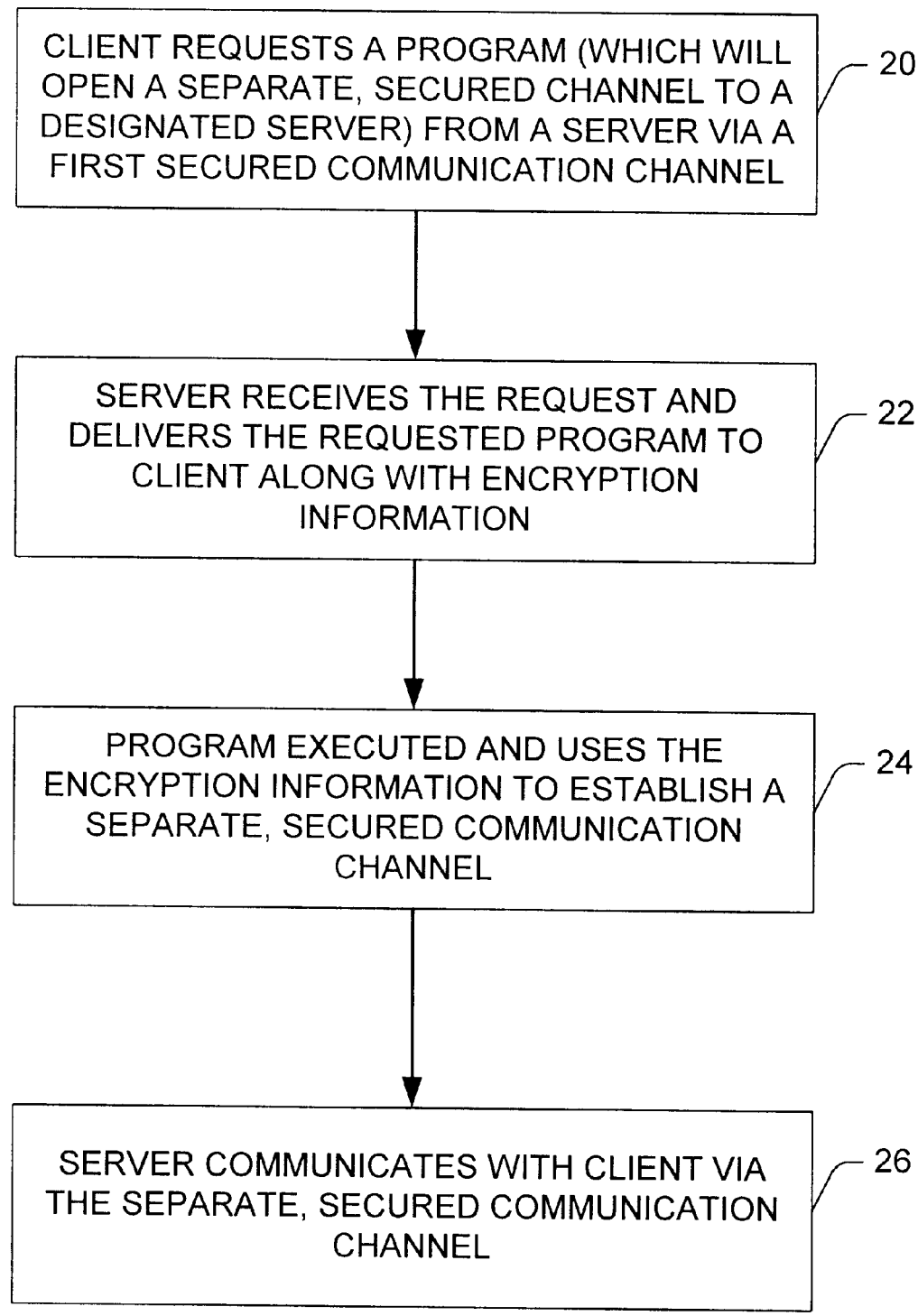
FIG. 2 is a flow chart generally illustrating the principal steps of a presently preferred embodiment of the present invention.

The presently preferred method, referring to FIG. 1, takes place between a server and a client over an interconnected network of computers such as the internet or an intranet, where any one of the machines can be a server or a client with respect to any other machine. Referring to FIG. 2, in a first step illustrated by box 20 of the presently preferred embodiment, a client requests a program from a server via a first secured communication channel. The program can be for any task, and as part of the task a secured communication channel will be required to be opened between the client and a designated server. Although the first communication channel in the preferred embodiment is a secured communication channel, any other means, methods, or channels for transmitting the requested program and a set of encryption information to the client will suffice. In the next step 22, the server delivers the requested program to the client along with the encryption information for establishing a separate communication channel with the designated server. The encryption information can be dynamically generated for this client. After the program is received by the client, the program is executed 24, and the received encryption information is used to establish a second secured communication channel for its use. Then, in the subsequent steps 26, the server and the client communicate with each other via the second secured communication channel. In this manner, a program on the client can establish a secured communication channel separate and apart from the original communication channel and may control and manipulate this channel for its use.

Figure 3:
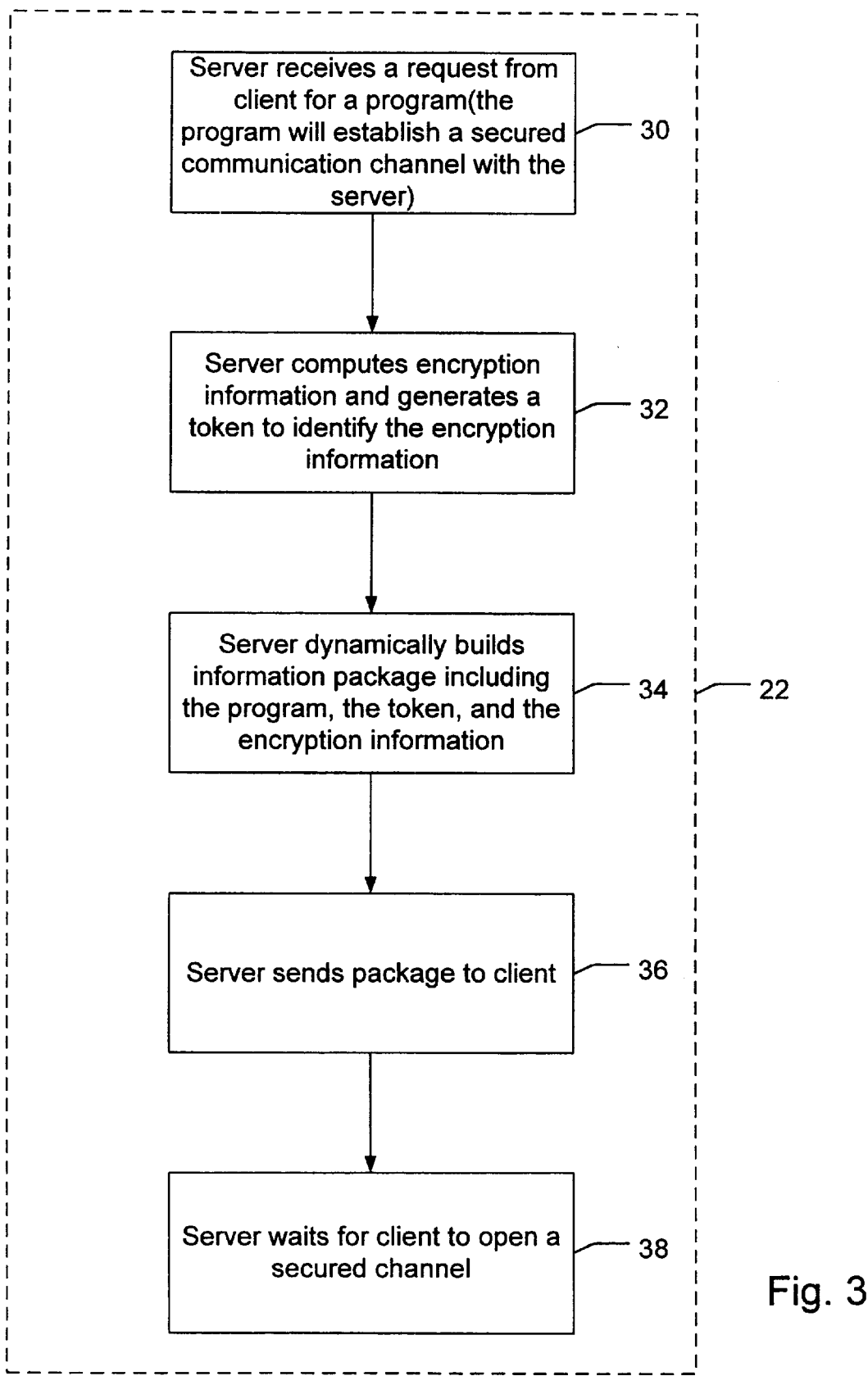
FIG. 3 is a flow chart illustrating the substeps of step 22 of FIG. 2.

FIG. 3 illustrates the detailed steps performed by the server upon receiving a request from the client (i.e. expanding box 22 of FIG. 2). In the first step 30, the server receives a request from the client for a program that will establish a secured communication channel as part of the task to be performed by the program. In order to provide for a secured communication channel, as suggested by box 32, the server computes a key and a set of unique encryption information in response to this particular request and generates a token for identifying this set of encryption information. Once the encryption information is generated, the program and the encryption information (including the token) are then dynamically packaged 34 and sent to the client 36. At this point, the server is ready and waits for the client to open a secured communication channel to carry out the tasks as defined by the program. Alternatively, the server can deliver the token and the encryption information to a designed server so that the designated server can decipher the encryption information and establish a secured communication channel with the client.

Figure 4:
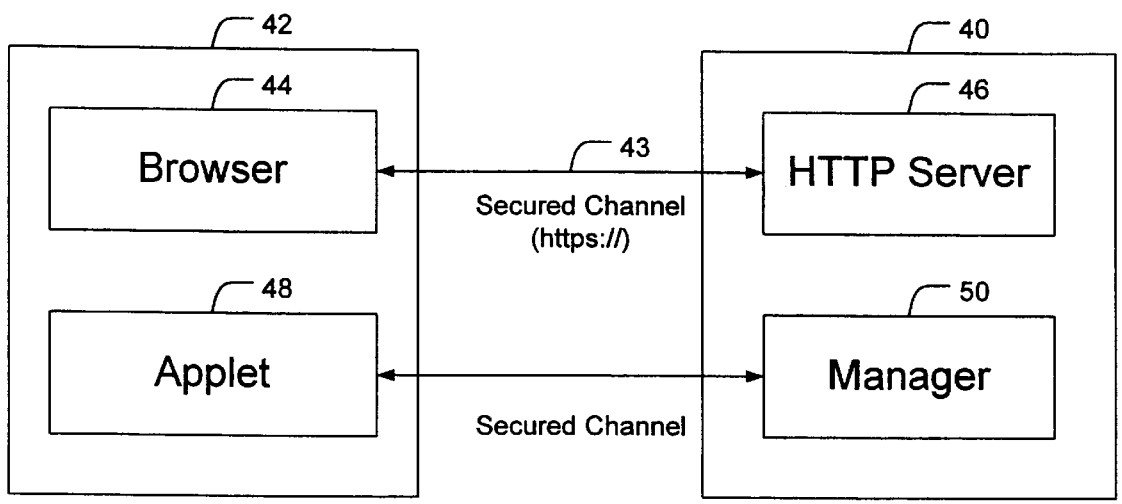
FIG. 4 is a block diagram illustrating a specific application of the preferred embodiment.

The presently preferred method can be easily adapted for internet applications. A web browser can readily establish a first secured communication channel when the heading "https://" is specified in the address heading. In this scenario, referring to FIG. 4, a request is made to a server 40 for a program to be delivered and executed on a client 42 for performing a task. The request is made through a web browser 44 on the client 40 and using a secured channel ("https://") 43 established by the web browser 44 under the (Hypertext Transfer Protocol with SSL) protocol. An HTTP (Hypertext Transfer Protocol) server 46 on the server 40 responds to the request and causes a manager on the server to generate a key from a random number source and a set (or table) of encryption information identified by a session token. The server then sends back the requested program, the generated encryption information, and the token over the secured channel 43, where the encryption information and token is to be used as parameters for the program. All of this information can be passed in the form of an HTML page where the program (or Java applet) is specified using an APPLET HTML tag, and its parameters (the encryption information) are specified as parameter tags. Binary data such as the computed encryption information is Base64 encoded and broken into 256 byte pieces in separate PARAM tags. For example, <HTML>
   <APPLET CODE=SECAPP.CLASS>
   <PARAM NAME=token VALUE="0001002">
   <PARAM NAME=table1 VALUE="01 03 FA . . . ">
   <PARAM NAME=table2 VALUE="0F A3 30 . . . ">
   . . .
   </APPLET>
   </HTML>

The manager also maintains the token and the set of encryption information on the server for later communication with the client to establish a secured communication channel. Note that the same set of encryption information can be used across multiple connections where each connection can be identified by an unique token. The requested program will typically be a Java applet 48 to be executed by a Java engine which is commonly included as part of the web browser. The applet 48 then would use the encryption information to establish the secured communication channel 49 by communicating and interacting with the manager 50 on the server 40 (or another designated server).

Figure 5:
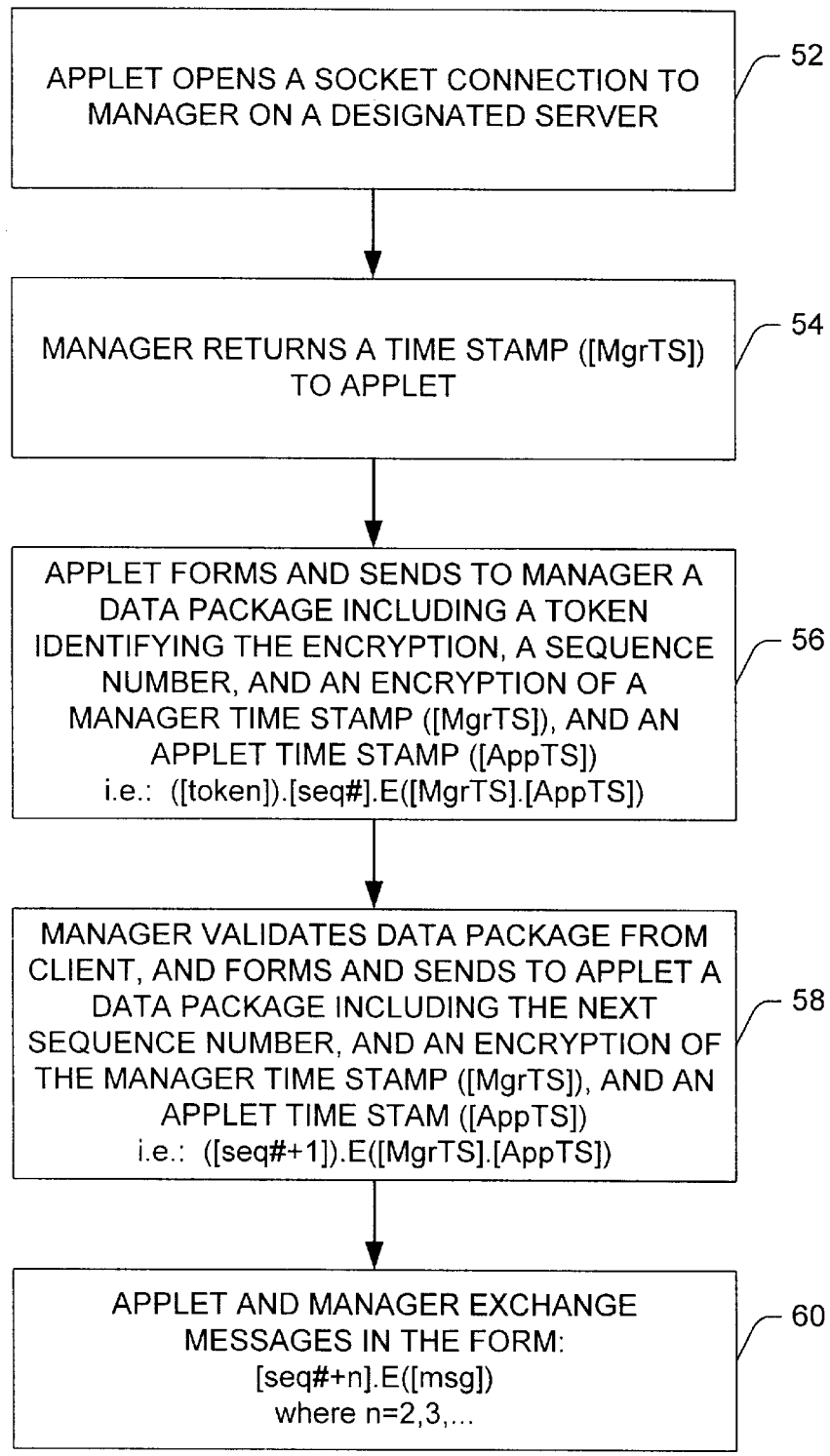
FIG. 5 is a flow chart illustrating the preferred handshake in establishing a secured communication channel between the client and the server.

Specifically, referring to FIG. 5, as indicated at box 52 the applet first opens a socket connection (preferably a TCP/IP connection) to a manager on a designated server, and the manager on the designated server in response returns a time stamp ([MgrTS]) to the applet 54. In the next step 56 and as part of the protocol, the applet forms a data package comprised of the token identifying the particular encryption information used by the applet, a sequence number for the data package, and an encrypted portion encrypting a combined time stamp [ComTS], where the combined time stamp includes the manager time stamp ([MgrTS]) and a time stamp provided by the applet ([AppTS]). The token allows the manager to identify which of the particular set of encryption information is to be used for encrypting the data packages. The sequence number allows the manager (and the client) to identify the order of the data packages. The manager time stamp allows the manager to identify the session of this particular secured socket connection, and the applet time stamp similarly informs the manager the time stamp information of the applet for this particular session. This data package is then sent to the manager. Note that the encryption here uses the encryption information from the server and the algorithm described below.

In the next step 58, the manager in response to the data package received from the client, decrypts the data package to obtain the combined time stamp, and compares its manager time stamp for this client with the manager time stamp obtained from the combined time stamp. If the two manager time stamps are the same, the data package is then validated. When the data package from the client has been validated, the manager then forms a data package including an encryption of the combined time stamp ([ComTS]) using the same set of encryption information sent to the client. The package is then sent to the client 60. The handshake protocol is now complete and subsequent data packages may be formed by including the next sequence number in order, and an encryption of the message to be passed. In this manner, all of the information passed between the client and the server is encrypted and therefore secured. Note that the handshake protocol between the client and the manager in initiating the session is not limited to the particular method described above; it can be modified in a variety of ways to identify the particular session and the particular set of encryption information.

While the present invention may employ any encryption method in securing the separate communication channel, the emphasis here is to use a software-efficient encryption method. In the preferred embodiment, a software-efficient encryption method such as the SEAL encryption method described in U.S. Pat. No. 5,454,039, and in an article entitled "Fast Software Encryption", Rogaway, Phillip and Coppersmith, Don, Proceedings of Cambridge Security Workshop, Dec. 9–11, 1993, can be used. To illustrate, given a 160-bit key k, and a 32-bit n, this encryption method stretches n into an L-bit string k(n). L can take any value less than 64 kilobytes. It has the property that if k is selected at random, then k(n) should be computationally indistinguishable from a random L-bit function of n.

The practical effect of a pseudo-random function encryption method is that it is useful in applications where traditional stream ciphers are not. With most stream ciphers, a sequence of bits is generated in one direction. By knowing the key and the position i, the only way to determine the i-th bit generated is to generate all the bits up until the i-th one. But with a pseudo-random function encryption method, access to any desired position is possible without generating all of the bits. A pseudo-random function encryption method also simplifies the synchronization problem encountered with standard stream ciphers. For example, encrypted messages can be lost over a channel. With a pseudo-random function encryption method, the receiver does not need to store any state to recover an encrypted message nor does it have to be concerned with lost messages since lost messages do not affect the message decryption process.

Figure 6:
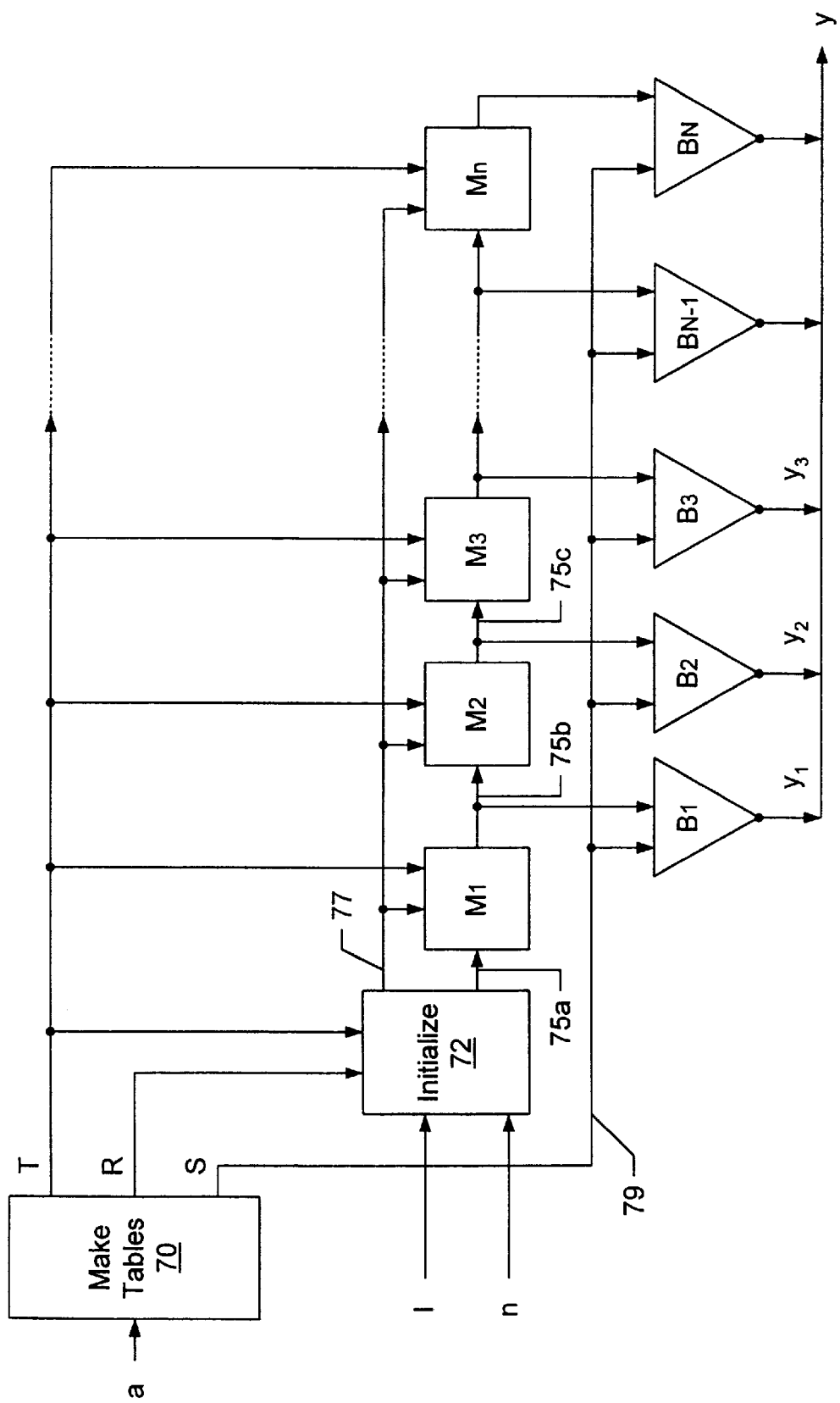
FIG. 6 is a block diagram illustrating an encryption method that may be used for the preferred embodiment.

An example of a pseudo-random encryption method such as the SEAL encryption method is illustrated in FIG. 6. The output T and R are tables used by an initialize means 72, which also receives as inputs the index n and a length control variable 1. The variable 1 is initially set to 0 and its upper limit will depend on the ultimate desired length of the output stream. The initialize means 72 generates a set of initial values for a set of registers (A, B, C, D, n1, n2, n3, n4) not shown but included within the initialize means 72. The first group of registers (A, B, C, D) have values that will be modified during a particular iteration of the algorithm to be described, whereas the second group of registers (n1, n2, n3, n4) have values that remain constants throughout the iteration. The method flirter implements a set of mixing functions, M1, . . . , Mn, and a set of masking functions B1, . . . , Bn, with n preferably equal to 64. Each mixing function Mi has a corresponding masking function Bi, and an iteration generally comprises a pair of such functions. Thus, mixing function M1 and masking function B1 are effected during a first iteration of the method, and so on. The sixty-four (64) iterations together define a phase of the algorithm, with each phase initiated by a call to the initialize means 72. When the particular phase is complete, the value of 1 is incremented.

The initial values of registers (A, B, C, D) of the first group are supplied via line 75a to the first mixing function M1 during the first iteration. Mixing function M1 also receives via line 77 the initial values from the second group of registers (n1, n2, n3, n4). As will be seen, the function M1 comprises a set of modification instructions which serve to randomize the values of the registers (A, B, C, D) to generate a set of pre-output values for these registers on line 75b. The corresponding masking function B1 receives these pre-output values as well as a set of values from table S via line 79. The masking function B1 uses the set of values from table S to mask the pre-output register values from the corresponding mixing function to generate a data string of pseudo-random bits y1.

In addition to being supplied to the masking function B1, preferably the pre-output values of registers (A, B, C, D) on line 75b are also provided as inputs to the mixing function of the next iteration, in this case M2. The mixing function also receives via line 77 the initial values of the second group of registers (n1, n2, n3, n4). As described above, these values are initialized by the initialize means 72 and remain constant throughout the phase. The initial values of the second group of registers are used to modify the pre-output (or perhaps even the initial) values of the first group of registers (from the prior iteration) to allow the mixing function (in this case M2) to more directly depend on information tied to the index n. The output of the mixing function M2 on line 75c is supplied to masking function B2, which receives these pre-output values as well as a next set of values from table S via line 79. The masking function B2 uses the set of values from table S to mask the pre-output register values from the corresponding mixing function to generate a data string of pseudo-random bits y2.

The iterations continue in this fashion. The particular data strings output from each iteration are concatenated to grow the output data stream. Accordingly, table S is formatted to be of a sufficient size so that one pass through the S-table values corresponds to the sixty-four (64) iterations. As noted above, this cycle is a phase. In the event that a phase does not produce a long enough output stream, a new phase is begun by a new call to the initialize process 72 with 1 having been incremented by 1. The process then uses new R-values and begins the cycle again to create new initial values for the registers (A, B, C, D, n1, n2, n3, n4). The iteration of the phase are then begun again. The overall process is stopped when the length of the output stream reaches a desired value.

This encryption method requires about five elementary machine operations to encrypt each byte of text. It runs at 58 megabits per second on a 50 Mhz 486 machine—which makes it a fast encryption method. On the other hand, SEAL must preprocess its key into internal tables. These tables total approximately 3 kilobytes in size and their calculation takes about 200 SHA computations. These tables are the tables transmitted to the client. Additional information with regard to this encryption method can be found in to the references cited above.

Although the present invention has been described in terms of specific embodiments it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method for establishing a secured communication channel between a client and a designated server over interconnected networks of computers, comprising the steps of:
    a) causing a client to request a program from a server via a first communication channel, said program being executable be said client for the purpose of establishing a secure communication channel;
    b) causing said client to receive said program and encryption information identified by a token;
    c) executing said program at said client in order to open a second communication channel between said client and a designated server by performing a handshake protocol exchange between said client and said designated server, said second communication channel being secure; and
    d) exchanging encrypted messages between said client and said designated server via said second channel.

2. A method as recited in claim 1 wherein said first channel is a secured channel.

3. A method as recited in claim 2 wherein said first channel is a secured channel established via a web browser.

4. A method as recited in claim 3 wherein said first channel is a secured channel established by the Hypertext Transfer Protocol with SSL (HTTPS) protocol.

5. A method as recited in claim 1 wherein said encryption information is generated using a pseudo-random function encryption method.

6. A method as recited in claim 1 wherein said program is written in the Java language.

7. A method as recited in claim 6 wherein said program is a Java applet to be executed by a web browser.

8. A method as recited in claim 1 wherein said encryption information is HTML coded for delivery.

9. A method as recited in claim 8 wherein said encryption information is provided as parameters to said program.

10. A method as recited in claim 1 wherein said exchanging handshake protocol step further includes the substeps of:
    1) receiving a manager time stamp from said designated server;
    2) sending to said server a first set of information including a first sequence number, said token, said manager time stamp, and a client time stamp, one or more pieces of said first set of information being encrypted; and
    3) sending to said client a second set of information including a second sequence number, said manager time stamp and said client time stamp, one or more pieces of said second set of information being encrypted.

11. A machine readable storage device encoding instructions for executing the method as recited in claim 1.

12. A system for establishing a secured communication channel between a client and a designated server over interconnected networks of computers, comprising:
    a) means for causing a client to request a program from a server via a first communication channel, said program being executable by said client for the purpose of establishing a secure communication channel;
    b) means for causing said client to receive said program and encryption information identified by a token;
    c) means for causing said client to execute said program in order to open a second communication channel between said client and a designated server by performing a handshake protocol exchange between said client and said designated server, said second communication channel being secure; and
    (d) means for exchanging encrypted messages between said client and said designated server via said second channel.

13. A system as recited in claim 12 wherein said first channel is a secured channel.

14. A system as recited in claim 13 wherein said first channel is a secured channel established via a web browser.

15. A system as recited in claim 14 wherein said first channel is a secured channel established by the Hypertext Transfer Protocol with SSL (HTTPS) protocol.

16. A system as recited in claim 12 wherein said encryption information is generated using a pseudo-random function encryption method.

17. A system as recited in claim 12 wherein said program is written in the Java language.

18. A system as recited in claim 17 wherein said program is a Java applet to be executed by a web browser.

19. A system as recited in claim 12 wherein said encryption information is HTML coded for delivery.

20. A system as recited in claim 19 wherein said encryption information is provided as parameters to said program.

21. A system as recited in claim 12 wherein said means for exchanging handshake protocol further includes:
    1) means for receiving a manager time stamp from said designated server;
    2) means for sending to said server a first set of information including a first sequence number, said token, said manager time stamp, and a client time stamp, one or more pieces of said first set of information being encrypted; and
    3) means for sending to said client a second set of information including a second sequence number, said manager time stamp and said client time stamp, one or more pieces of said second set of information being encrypted.

22. A method for establishing a secured communication channel between a client and a designated server over interconnected networks of computers, comprising the steps of:
    a) causing a client to request a server to deliver a program via a first secured communication channel established by a web browser, said program to be executed by said client for the purpose of establishing a secure communication channel;

b) causing said server to deliver over said first secured communication channel to said client said requested program with a set of encryption information identified by a token;

c) executing said requested program in order to open a second secured communication channel by performing a handshake protocol exchange between said client and said designated server using said set of encryption information and said token; and d) exchanging encrypted messages over said second secured communication channel between said client and said server.

* * * * *